//  
United States Patent Office 2,923,615
Patented Feb. 2, 1960

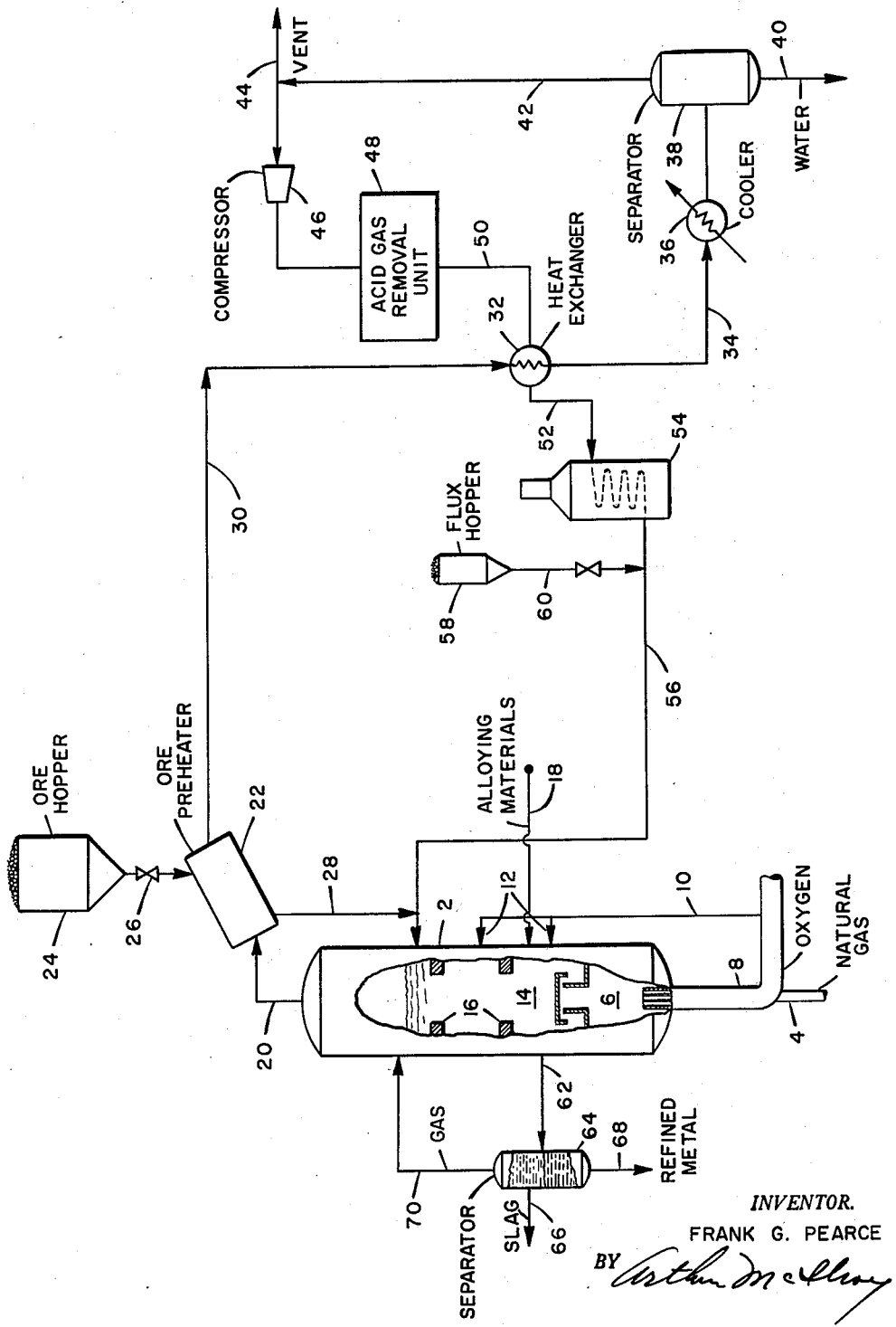

---

2,923,615

PROCESS FOR OBTAINING METALS FROM THEIR ORES

Frank G. Pearce, Tulsa, Okla., assignor to Pan American Petroleum Corporation, Tulsa, Okla., a corporation of Delaware Application March 28, 1957, Serial No. 649,194

2 Claims. (Cl. 75—40)

The present invention relates to improvements in obtaining metals from their ores. More particularly, it is concerned with a novel method for recovering metals from their oxidic ores without the use of coke or its equivalent as a reducing agent.

While the principal industrial method presently employed for recovering metals from their oxides is fundamentally based on the general procedure used in iron ore blast furnace operations, much effort has been directed to more economic processes to accomplish this result. This effort to improve upon the blast furnace technique for recovering metals from their ores stems from the fact that such procedure is extremely inefficient. In addition to acting as a smelter for the ore, the blast furnace functions as a gas producer manufacturing fuel from high grade coke. Much of the gas thus formed is either wasted or else used for purposes that much cheaper fuels could fulfill equally well. Moreover, the pig iron produced by the operation of an iron ore blast furnace has a high carbon content and must therefore be charged to an open hearth furnace, along with costly scrap iron, to give a product iron (steel) which does not have an objectionable carbon content. The open hearth process reduces the carbon content of the blast furnace product partly by actual removal of the carbon from the pig iron charge, and partially by the dilution effect of the relatively carbon free scrap iron charge. Other refining processes, such as addition of alloying components, are also performed in the open hearth.

Largely because of economic considerations, much effort has been directed to devise a practical and efficient process for by-passing the blast furnace by which steel of industrial quality could be obtained from iron ore in essentially one step. As a possible compromise between this last mentioned process and the blast furnace, considerable effort has also been spent in development of a method by which substantially pure iron ores or oxides can be directly reduced to produce sponge iron which in turn can be used as a substitute for steel scrap and pig iron. Generally speaking, reduction of iron ore to produce sponge iron can be carried out by contacting finely divided high grade ore with a reducing gas at much lower temperatures than employed in conventional processes, i.e., 700° to about 1650° F., and at pressures ranging from about atmospheric up to about 400 or 500 p.s.i. In producing sponge iron the reduction process is carried out under conditions such that the finely divided solid ore behaves as a boiling liquid due to the rising reducing gas which may have a linear velocity of 0.7 to 1.5 feet per second. By this process a reduced product is secured which contains very little oxide—generally less than 10 or 15 percent. Methods for producing sponge iron in recent years have been the subject of intensive research and development. As a result, procedures for manufacturing iron of this type are on the point of commercialization. Such methods, however, are somewhat handicapped in that they require relatively high grade ores as starting material, since there has been no practical method developed, as yet, for disposal of objectionable impurities found in the lower grades of ore except by melting and slagging with flux materials.

Accordingly, it is an object of my invention to provide a method capable of using either low or high grade ores and converting them in one step into a refined metal having an unobjectionable percentage of impurities. It is another object to effect recovery of metals from their oxidic ores without the use of coke, thereby avoiding the disadvantages characteristic of processes employing free carbon as the primary reducing agent. It is a further object of my invention to provide a process for producing metals from their oxidic ores by the use of gaseous reducing agents under conditions such that the reducing efficiency of said agents is substantially at a maximum.

In carrying out an embodiment of my invention, for example, as applied to the recovery of iron from its ores, iron oxide ore and a suitable fluxing material, if required, such as limestone or dolomite, or calcined products from these materials, are charged to a suitable furnace containing molten scrap iron at a temperature of the order of 2700° to about 3000° F. Heat is supplied to the base of the furnace by the partial combustion of powdered coal, gaseous or liquid hydrocarbons, etc., with air, oxygen-enriched air, or substantially pure oxygen Conditions of combustions may be the same as those required for operation of a gas generator using methane and oxygen to produce synthesis gas. The oxygen and coal, or hydrocarbon, when employed in an oxygen-fuel ratio of about 0.55:1 to about 0.7:1 mol of oxygen per atom of carbon yield hydrogen and carbon monoxide as the principal products in a molar ratio of about 2:1. The partial combustion process itself generates temperatures of the order of 3000° to about 3500° F. and thus generally serves as a source of heat for providing a sufficiently high temperature in the reduction zone of the furnace to permit the hot product gas mixture to reduce the iron oxide to free iron. Depending on the extent of heat loss from the system, additional quantities of oxygen may be required to maintain temperatures in the reduction zone at the desired level. Such additional heat may be supplied by injecting oxygen at one or more points in the general area of the reduction zone. This oxygen burns a portion of the synthesis gas produced in the combustion zone thereby counteracting the endothermic effect of ore reduction by the synthesis gas. Heat is also obtained to some degree in this same operation by the burning of various impurities such as phosphorus, carbon (from gas manufacture), etc., which may be present. The quantity of oxygen added to the system in this manner may vary, but in general ranges from zero up to an amount corresponding to that used in the partial combustion step in synthesis gas preparation. This means that the total quantity of oxygen charged in the process of my invention may correspond to an oxygen fuel ratio of about 1.4 mols per atom of carbon introduced as fuel.

Under the temperature conditions prevailing in the reduction zone, e.g. about 2800° F., the mixture of iron, iron oxide and flux, becomes a molten bath. Iron ore and fluxing material, if necessary, are continuously added to the molten bath, preferably by means of a carrier gas which is also a reducing gas composed mainly of carbon monoxide and hydrogen. The molten bath is violently agitated by the stream of hot rising gases from the partial combustion step. At a point substantially near the base of said bath, but above the level at which reducing gas is introduced, hot molten liquid is drawn off into a separating vessel where slag is removed from the refined metal.

The process of my invention may be further illustrated by reference to the accompanying drawing which is a schematic representation of one particular way in which the invention can be practiced. Smelting unit 2 is originally charged, for example, with scrap or pig iron. Natural gas charged through pipe 4 is burned in open combustion zone 6 with substantially pure oxygen added through pipe 8 to produce carbon monoxide and hydrogen at a temperature of about 3000° F. The oxygen and natural gas are charged to the combustion zone at high velocities, e.g. 100 to 400 feet per second, to insure complete and rapid mixing. Introduction of these gases in this manner and in a ratio of about 0.55 to about 0.7 mol of oxygen per mol of natural gas (calculated as methane) provide conditions resulting in a minimum of carbon formation. The heat from the resulting hot combustion products, together with oxygen introduced into the system via lines 10 and 12, melt the initial charge of iron. The smelter is then ready to receive the regular charge of ore and fluxing material in accordance with the process of my invention.

The amount of fuel and oxygen fed to the combustion zone, to some degree, depends on the type of ore involved, the heat insulation in the reduction zone; and the extent to which the ore, flux, and fuel-oxygen mixture are preheated. Iron ore, for example, may be preheated to temperatures up to about 2100° F. Also, fuel and oxygen preheats may be increased to as much as 1200° or 1300° F. and up to about 1600° F., respectively. When air or oxygen-enriched air is used, preheat temperatures of about 1500° to about 2000° F. may be employed as another means for elevating the temperature in the reduction zone to the proper level. By adequate preheat of the smelter charge and the fuel-oxygen mixture, together with proper equipment design to minimize heat losses, the overall oxygen requirements can be held to a relatively low level and the quantity of oxygen fed to the system via spaced injection through line 10 may be held to a minimum.

In order to obtain a substantially oxide-free refined metal I prefer to use a smelting unit having compartmented zones 14 defined by reinforced refractory slabs 16. These compartments permit the gases to rise through the bath but tend to minimize the mixing of liquids except within a given compartmented section. Thus, countercurrent contacting of the reducing gases with the molten bath is secured resulting in a high concentration of oxide and flux in the uppermost compartment and a low concentration of oxide in the bottom section of the smelter from which refined metal is withdrawn. Alloying materials may be added to the bath, if desired, through line 18 to permit production of finished steel.

Hot gases are taken overhead from the smelter through line 20 and introduced into ore preheater 22. The latter is fed from ore hopper 24 with the flow of ore to the preheater being controlled through valved line 26. The heated ore is removed from preheater 22 through line 28 and joints the charge of carrier gas and flux going into the smelter via line 56. Hot effluent gases from ore preheater 22 generally consist principally of carbon dioxide, hydrogen sulfide, steam, carbon monoxide and hydrogen. This hot gaseous stream is taken through line 30 at a temperature of from about 800° to about 1500° F., run through heat exchanger 32, line 34, then cooler 36 and transferred to separator 38 where liquid water is removed through line 40. Uncondensed gases, which are now at a temperature of about 100° F., are transferred through line 42 where a minor portion is vented through line 44 to purge the system of inert gas and the remainder compressed to form about 100 to 400 p.s.i. (about smelting unit pressure) in compressor 46. Acidic gases in the compressed stream, such as carbon dioxide and hydrogen sulfide, may be separated from the carbon monoxide and hydrogen by running said stream through an acid gas removal system 48, diagrammatically shown, and the resulting acid gas-free stream sent through line 50 where it picks up heat in exchanger 32 from hot gases flowing through line 30. The preheated stream is then taken through line 52 to direct fired heater 54, heated to about 1400° F. and is used as a carrying medium in line 56 for flux in hopper 58. Flux fed to line 56 through valved line 60 is then transferred in the desired amount through line 56 and continuously introduced with preheated ore, as described above, into molten bath 14. The mixture of ore and flux is trapped in the bath and rapidly melts. The ratio of fresh reducing gases generated in combustion zone 6 to the reducing gases returned to the system via line 56 generally may range from about 0.5 to 2.0.

A mixture of slag and refined iron is continuously withdrawn from the smelter through line 62 and transferred to a separator 64. A slag layer forming on top is continuously withdrawn through line 66 while refined metal is removed through line 68. Gas from the separator is taken overhead through line 70 and returned to the smelter at a level above the surface of molten bath 14. If a metal of higher purity than that withdrawn through line 68 is desired, oxygen or oxygen-enriched air may be blown through the molten metal in controlled amounts and in a known manner to secure a metal of the desired purity. If substantially pure iron oxides, for example, iron mill scale, are used as the initial charge, however, the product obtained through line 68 generally will contain less than 0.1 percent carbon. In any event the refined metal product thus obtained contains not more than about 2 percent carbon.

From the foregoing description it will be seen that my invention possesses a number of important advantages over the lower temperature fluid bed reduction method used to produce sponge iron and over the conventional blast furnace type of operation referred to above. Specifically, my invention has the following advantages over the aforesaid fluid bed reduction process:

(1) The synthesis gas requires no processing but can be injected directly into the reduction vessel. The small amounts of carbon present in such gas have no harmful effect on the reactions concerned or upon the final product.

(2) At the higher reduction temperatures of my process, both hydrogen and carbon monoxide are very active reducing agents and iron carbides are not formed. Consequently facilities to shift carbon monoxide to carbon dioxide, as are required where hydrogen is employed as the principal reducing gas, are not necessary.

(3) Equilibrium considerations show that the conversion of hydrogen and carbon monoxide per pass is much higher than in the case of the lower temperature fluid bed reduction process.

(4) Impure ores may be employed because the impurities can be readily eliminated from the system as slag by the addition of fluxing compounds.

(5) The metal is produced as a liquid which can be handled in methods conventional to steel operations.

(6) The thermal efficiency of the usual processes of reducing iron ores to the metal by the use of conventional reducing gases, such as carbon monoxide and hydrogen-containing gases, is notoriously low. On the other hand the thermal efficiency of the process of my invention is extremely high with a minimum of increases and decreases in gas temperature being required. With known methods using reducing gases, such as carbon monoxide and hydrogen, the fluctuations in temperature encountered in ordinary gas generation, in shifting of the product gas to produce more hydrogen, and in fluid bed reduction operations are much greater.

Specific advantages of my invention over the conventional blast furnace technique are:

(1) A higher capacity since lifting of a packed bed by high gas velocities is not a problem.

(2) Simplicity of the system and ease of shutdown or startup.

(3) Production of elemental iron substantially free of carbon.

(4) Preparation of finished steel from iron ore in one step by being able to add the necessary alloying components continuously to the unit thereby eliminating the open hearth steel finishing step.

While the process of my invention has been particularly described with reference to the application thereof to iron ore reduction, it is to be understood that said invention is equally applicable to a number of other readily reducible metal oxides, such as, for example, the oxides of lead and copper. In the case of oxides such as those mentioned, it will be apparent to those skilled in the art that different operating temperatures will be applicable from those taught herein with respect to iron. This will also necessitate different optimum ratios of oxygen to fuel. However, with the basic principles of my invention having been specifically set forth above, it will be apparent to those skilled in the art what modifications should be made in order to adapt my invention to the refining of metals other than iron.

I claim:

1. In a continuous process for recovering iron from an oxidic iron ore containing an objectionable concentration of impurities, the improvement which comprises effecting partial combustion of a hydrocarbonaceous fuel with oxygen in a known manner to produce a mixture consisting essentially of carbon monoxide and hydrogen, continuously forcing said mixture of carbon monoxide and hydrogen through a molten mass comprising essentially said ore, slag and free iron to maintain said mass at the proper temperature for reduction of said ore therein to the free metal, withdrawing hot effluent gases from said mass and heat exhanging said hot effluent gases with fresh ore, thereafter cooling said gases to remove water therefrom, compressing said gases and removing acid components therefrom, next heating said gases and employing the latter as a carrier for fluxing material, continuously charging to the top section of a reduction zone containing said mass a mixture of said fluxing material and previously heated ore below the surface of said molten liquid mass, supplying additional oxygen to said mass at at least one level therein, the amount of oxygen so injected being not more than about the same quantity employed in said partial combustion step, and continuously withdrawing from said zone a stream containing molten slag and refined iron.

2. In a continuous process for recovering a metal from a metal oxide reducible to said metal by hydrogen and carbon monoxide and containing an objectionable concentration of impurities, the improvement which comprises effecting partial combustion of a hydrocarbonaceous fuel with oxygen in a known manner to produce a mixture consisting essentially of carbon monoxide and hydrogen, continuously forcing said mixture of carbon monoxide and hydrogen through a molten mass comprising essentially said metal oxide, slag and said metal to maintain said mass at the proper temperature for reduction of said metal oxide therein to the free metal, withdrawing hot effluent gases from said mass and heat exchanging said hot effluent gases with fresh metal oxide, thereafter cooling said gases to remove water therefrom, compressing said gases and removing acid components therefrom, next heating said gases and employing the latter as a carrier for fluxing material, continuously charging to the top section of a reduction zone containing said mass a mixture of said fluxing material and previously heated metal oxide below the surface of said molten liquid mass, supplying additional oxygen to said mass at at least one level therein, the amount of oxygen so injected being not more than about the same quantity employed in said partial combustion step, and continuously withdrawing from said zone a stream containing molten slag and refined metal.

References Cited in the file of this patent

UNITED STATES PATENTS

| | | |
|---|---|---|
| 55,710 | Reese | June 19, 1866 |
| 195,891 | Hamilton | Oct. 9, 1877 |
| 1,160,822 | Beckman | Nov. 16, 1915 |
| 1,167,016 | Pratt | Jan. 4, 1916 |
| 2,142,100 | Avery | Jan. 3, 1939 |
| 2,562,813 | Ogorzaly et al. | July 31, 1951 |
| 2,593,505 | Wagstaff | Apr. 22, 1952 |
| 2,668,759 | Tenenbaum | Feb. 9, 1954 |

OTHER REFERENCES

Wilder: "Journal of Metals," December 1949 (pages 22 and 23 relied on).